US008237654B2

(12) United States Patent
Kang

(10) Patent No.: US 8,237,654 B2
(45) Date of Patent: Aug. 7, 2012

(54) DISPLAY APPARATUS AND CONTROL METHOD THEREOF

(75) Inventor: Jeong-woo Kang, Suwon-si (KR)

(73) Assignee: Samsung Electroncis Co., Ltd., Suwon-si (KR)

( * ) Notice: Subject to any disclaimer, the term of this patent is extended or adjusted under 35 U.S.C. 154(b) by 1035 days.

(21) Appl. No.: 12/187,165

(22) Filed: Aug. 6, 2008

(65) Prior Publication Data

US 2009/0153476 A1 Jun. 18, 2009

(30) Foreign Application Priority Data

Dec. 18, 2007 (KR) ........................ 10-2007-0133450

(51) Int. Cl.
*G09G 3/36* (2006.01)
*G09G 5/00* (2006.01)
(52) U.S. Cl. .................. 345/156; 345/157; 345/158
(58) Field of Classification Search .................. 345/156, 345/157, 168, 170, 173
See application file for complete search history.

(56) References Cited

U.S. PATENT DOCUMENTS

| 5,594,469 | A * | 1/1997 | Freeman et al. | 345/158 |
| 5,767,842 | A * | 6/1998 | Korth | 345/168 |
| 6,256,033 | B1 * | 7/2001 | Nguyen | 715/863 |
| 6,611,253 | B1 * | 8/2003 | Cohen | 345/168 |
| 6,614,422 | B1 * | 9/2003 | Rafii et al. | 345/168 |
| 6,963,937 | B1 * | 11/2005 | Kamper et al. | 710/73 |
| 7,042,442 | B1 * | 5/2006 | Kanevsky et al. | 345/169 |
| 7,259,747 | B2 * | 8/2007 | Bell | 345/156 |
| 7,378,585 | B2 * | 5/2008 | McGregor | 84/600 |
| 7,911,447 | B2 * | 3/2011 | Kouno | 345/158 |
| 2001/0012001 | A1 * | 8/2001 | Rekimoto et al. | 345/173 |
| 2003/0063775 | A1 * | 4/2003 | Rafii et al. | 382/106 |

FOREIGN PATENT DOCUMENTS

| JP | 2004-078977 A | 3/2004 |
| KR | 10-2003-0021987 A | 3/2003 |
| KR | 10-2006-0101071 A | 9/2006 |
| KR | 10-2007-0009207 A | 1/2007 |
| KR | 10-2007-0030398 A | 3/2007 |
| KR | 10-2007-0071187 A | 7/2007 |

OTHER PUBLICATIONS

Communication dated Sep. 22, 2011, issued by the Korean Intellectual Property Office in counterpart Korean Application No. 10-2007-0133450.

* cited by examiner

*Primary Examiner* — Amare Mengistu
*Assistant Examiner* — Aaron M Guertin
(74) *Attorney, Agent, or Firm* — Sughrue Mion, PLLC

(57) ABSTRACT

A method of controlling a display apparatus includes: displaying a pointer corresponding motion of a user, in which the user's motion is analyzed on the basis of images generated by sensing the user; and generating an input signal preset corresponding to the analyzed motion of the user. With this configuration, a user can input a command without using an additional physical device or being subject to spatial limitations.

16 Claims, 5 Drawing Sheets

DISPLAY APPARATUS AND CONTROL METHOD THEREOF

CROSS-REFERENCE TO RELATED APPLICATION

This application claims priority from Korean Patent Application No. 10-2007-0133450,filed on Dec. 18, 2007 in the Korean Intellectual Property Office, the disclosure of which is incorporated herein by reference.

BACKGROUND OF INVENTION

1. Field of Invention

Apparatuses and methods consistent with the present invention relate to a display apparatus and a control method thereof, and more particularly, to a display apparatus which can sense motion of a user and a control method thereof.

2. Description of the Related Art

An interactive digital television (TV) or similar display apparatus may provide various services. In particular, interactive service using digital data allows a user to utilize various contents such as video on demand (VOD), "Noraebang," a shopping mall, banking, interactive education, etc. as well as to watch TV. Here, the "Noraebang" is a service that provides music and lyrics played to accompany or support a singer or another instrument.

The display apparatus displays a menu related to an image and such services. Further, a user may input movement, selection and characters on the menu of the display apparatus. Here, a wireless keyboard or a wireless mouse as well as a remote controller may be used for the complicated and various inputs.

Further, the display apparatus may sense motion of a user so as to receive the inputs from a user. At this time, besides such basic input devices, the display apparatus needs an additional device such as a camera or similar sensor for sensing the motion of a user.

However, a conventional display apparatus is inconvenient for a user to use and manage an additional device for sensing the motion of a user. For example, the conventional display apparatus has to employ a glove, a device to be put on a finger, a device to be gripped by a hand, etc., which are each provided with the sensor for sensing the motion of a user, and thus a user may be inconvenienced when using them.

SUMMARY OF THE INVENTION

Accordingly, it is an aspect of the present invention to provide a display apparatus which can receive inputs from a user without using an additional physical device and being subject to spatial limitations, and a control method thereof.

The foregoing and/or other aspects of the present invention can be achieved by providing a method of controlling a display apparatus, comprising: displaying a pointer corresponding to motion of a user, in which the user's motion is analyzed on the basis of images generated by sensing the user; and generating an input signal preset corresponding to the analyzed motion of the user.

The displaying the pointer may comprise displaying a virtual input unit and a virtual hand put on the virtual input unit.

The displaying the pointer may comprise displaying a start pointer when it is determined that a back and a palm of a hand of the user are alternately shown when analyzing the motion of the user.

The displaying the pointer may comprise displaying the virtual hand to move corresponding to the motion of the user's hand when analyzing the motion of the user.

The displaying the pointer may comprise generating a plurality of images by taking pictures of the user.

The method may further comprise recognizing who the user is on the basis of the generated images, and storing information about the motion of the user in a database.

The displaying the pointer and the generating the input signal may comprise analyzing the motion of a part of a body of the user on the basis of the database.

The method may further comprise analyzing the motion of a part of a body of the user according to preset motion sensitivity.

The foregoing and/or other aspects of the present invention can be achieved by providing a display apparatus comprising: an image sensing unit which senses a user to generate an image; an image processor which processes a pointer to be displayed; a display unit which displays the processed image; a controller which controls the image processor to display the pointer corresponding motion of a user, in which the user's motion is analyzed on the basis of generated images, and generates an input signal preset corresponding to the analyzed motion of a part of a body of the user.

The controller may control the image processor to display a virtual input unit and a virtual hand put on the virtual input unit.

The controller may control the image processor to display a start pointer when it is determined that a back and a palm of a hand of the user are alternately shown.

The controller may control the image processor to display the virtual hand to move corresponding to the motion of the user's hand.

The image sensing unit may generate a plurality of images by taking pictures of the part of the body of the user.

The display apparatus may further comprise a storage unit which stores the input signal corresponding to the motion of the part of the body of the user.

The controller may recognize who the user is on the basis of the generated images, store information about the motion of the user as database, and analyze the motion of the part of the body of the user on the basis of the database.

The controller may analyze the motion of the part of the body of the user according to preset motion sensitivity, and generate the input signal preset corresponding to the analyzed motion of the user.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
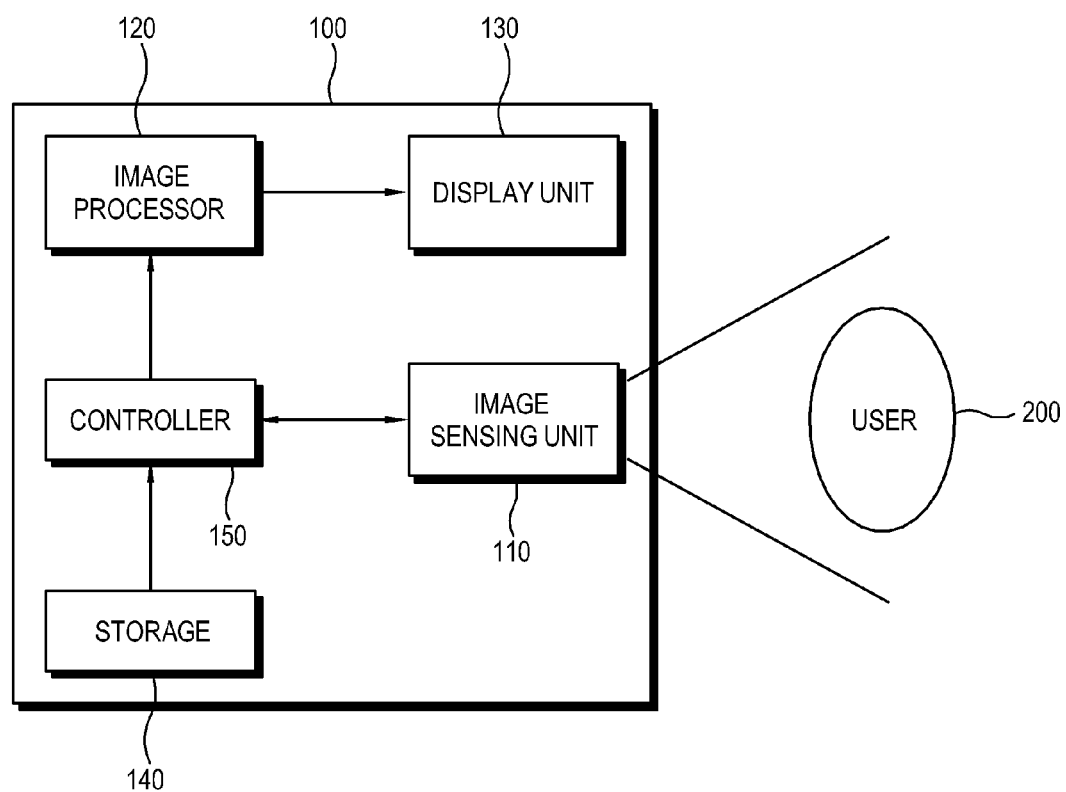
FIG. 1 is a block diagram of a configuration of a display apparatus according to an exemplary embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

FIG. 1 is a block diagram of a configuration of a display apparatus 100 according to an exemplary embodiment of the present invention. The display apparatus 100 is capable of sensing motion of a user. For example, the display apparatus 100 includes a plurality of cameras, and analyzes motion of a user on the basis of images taken by the plurality of cameras.

As shown in FIG. 1, the display apparatus 100 includes an image sensing unit 110, an image processor 120, a display unit 130, a storage unit 140, and a controller 150.

The image sensing unit 110 senses a user 200 and generates an image. For example, the image sensing unit 110 may include a plurality of cameras to take a picture of a part of a body of the user 200 while the user 200 moves and to generate a plurality of images. The image sensing unit 110 may include a digital camera, an infrared sensor, etc.

The image processor 120 processes a pointer to be displayed. The pointer may include a mouse-based pointer or a keyboard-based cursor, etc. Further, the image processor 120 processes a video signal to be displayed along with a user interface (UI).

The display unit 130 displays an image based on the video signal processed by the image processor 120. The display unit 130 may be achieved by a cathode ray tube (CRT), a liquid crystal display (LCD), a plasma display panel (PDP), a digital light processing (DLP), an organic light emitting diode (OLED), a surface-conduction electron-emitter display (SED), a field emission display (FED), etc.

The storage unit 140 stores an input signal corresponding to motion of a part of a user's body. For example, a moving distance and a position of a pointer are stored in the form of a database in the storage unit corresponding to a moving distance and a position of a user's hand. Further, a predetermined input signal corresponding to when a finger moves beyond a predetermined range is stored in the storage unit 140. The data base stored in the storage unit 140 has to be maintained even if power is off Accordingly, the storage unit 140 may be achieved by a non-volatile memory such as a random access memory (ROM) or the like, a hard disk drive (HDD), etc.

The controller 150 analyzes the motion of the user 200 on the basis of the images generated by the image sensing unit 110, and controls the image processor 120 to display the pointer corresponding to the motion of the user 200. Further, the controller 150 analyzes the motion of a part of the user's body, and generates an input signal preset corresponding to the analyzed motion.

For example, the controller 150 analyzes the image and determines a hand's position and a finger's motion of the user 200, thereby mapping the positions of the hand and the finger with predetermined positions of a keyboard. Further, the cursor of the mouse or the keyboard is moved corresponding to the motion of the hand. Also, if it is determined that the motion of the finger is provided for generating the input signal, e.g., if the finger poses for pressing a key, the input signal for the key of the keyboard is generated corresponding to the finger's position.

Figure 2:
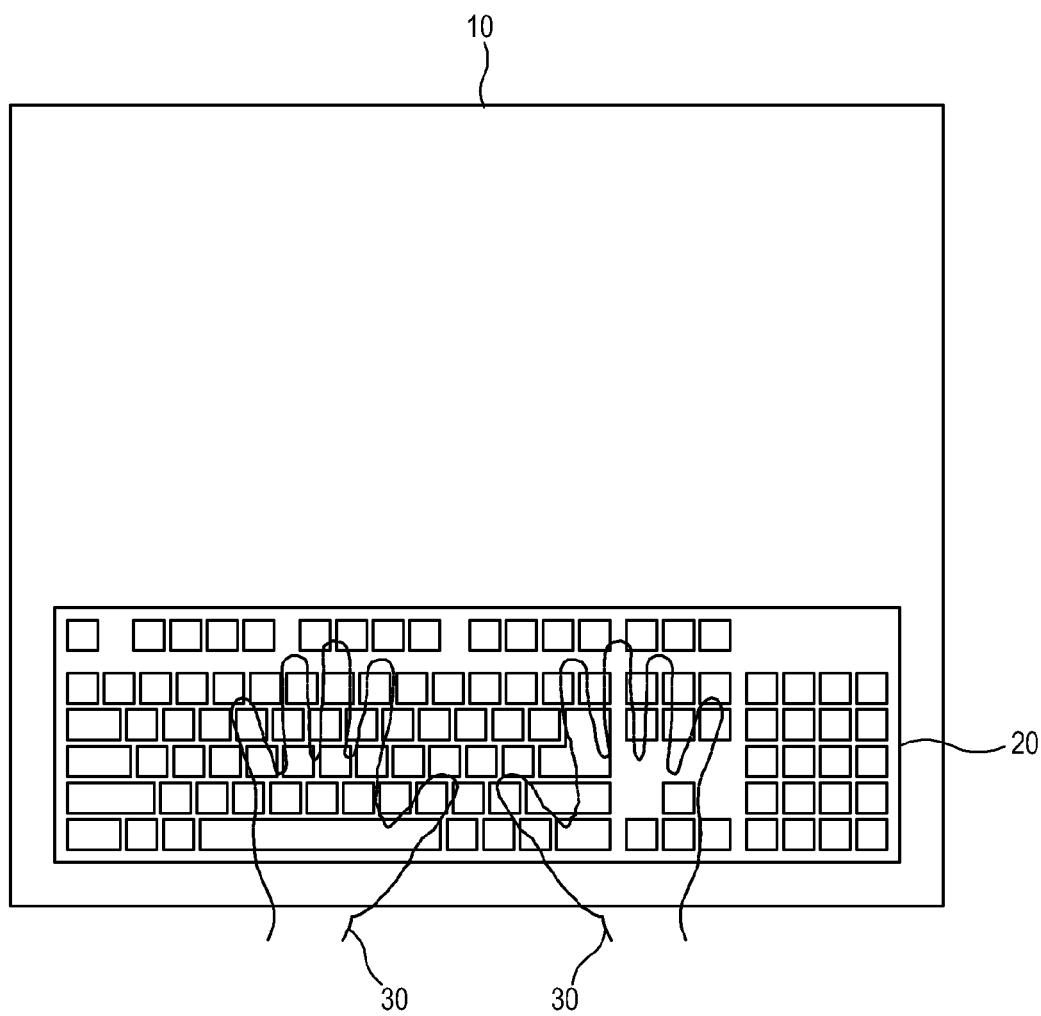
FIG. 2 shows a screen of the display apparatus according to an exemplary embodiment of the present invention.

The controller 150 controls the image processor 120 to display an input unit and a virtual hand put on the input unit. As shown in FIG. 2, a virtual keyboard 20 as the input unit and a virtual hand 30 may be displayed on a screen 10 of the display unit 130. The virtual hand 30 corresponds to the physical hand of the user 200, so that the virtual hand 30 can have the same pose as the hand or the finger of the user 200 when the hand or the finger moves. Thus, since the user 200 can see where the virtual hand 30 is put on the keys of the virtual keyboard 20, more correct key input is possible.

Meanwhile, if the controller 150 determines that the back and the palm of the user's hand are alternately shown when analyzing the motion of the user 200, the controller 150 controls the image processor 120 to display a start pointer. Then, the controller 150 analyzes the motion of the user 200 and controls the image processor 120 to display the virtual hand 30 moving according to the analyzed motion of the user 200. The start pointer means the virtual keyboard 20 and the virtual hand 30 which are initially displayed.

In more detail, if the back and the palm of the user's hand are alternately shown to the camera, the quantity of light is alternately increased and decreased in the sensed image because the palm has low melanin content regardless of race. If it is determined that such variation in the quantity of light is higher than a predetermined value, the controller 150 converts an input mode for a physical input unit into a virtual input mode for receiving the input based on the user's motion. Then, the controller 150 controls the image processor 120 to display the virtual keyboard 20 and the virtual hand 30 on the screen 10. At a default state of the virtual input mode, the first fingers of both virtual hands 30 displayed on the screen 10 may be placed on "F" and "J" keys of the virtual keyboard 20. On the other hand, a user may use a remote controller or the like for inputting a start signal to the display apparatus 100, thereby starting the virtual input mode and displaying the start pointer from a user.

Further, the controller 150 may recognize who the user 200 is on the basis of the generated images, store information about the motions of the users 200 in a database, and analyze the motion of a part of the body of the user 200 on the basis of the database. For example, the controller 150 recognizes who the user 200 is, stores the information about the motion of each user 200 in the database, and uses the database when analyzing the motion of the user 200.

Also, the controller 150 may analyze the motion of a part of the body of the user 200 according to preset motion sensitivity, and generate a preset input signal corresponding to the analyzed motion of the user 200. For example, if the motion sensitivity is set to a first level by the user 200, the user 200 has to show an exaggerated motion so as to make the controller 150 analyze the motion of the user 200 as the input. The higher the level at which the motion sensitivity is set, the less the user 200 has to move to enable the motion analysis.

Figure 3:
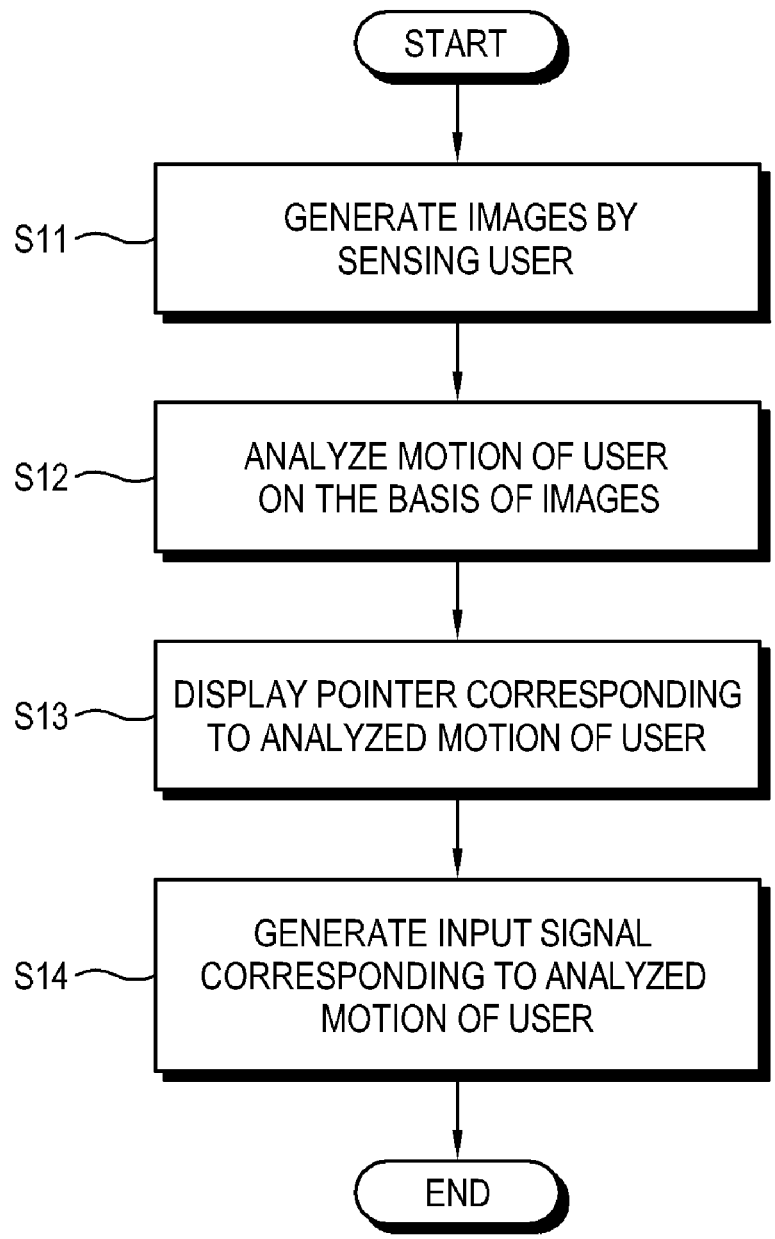
FIG. 3 is a flowchart of a process of operating the display apparatus according to an exemplary embodiment of the present invention.

Below, a control method of the display apparatus 100 according to an exemplary embodiment of the present invention will be described with reference to FIG. 3.

At operation S11, the display apparatus 100 takes a picture of the user 200 and generates the images. For example, the image sensing unit 110 may include a plurality of cameras to take a picture of a part of the body of the user 200 while the part moves and to generate the plurality of images. Here, the image sensing unit 110 may take pictures every predetermined unit of time.

At operation S12, the display apparatus 100 analyzes the motion of the user on the basis of the generated images. For example, the controller 150 determines the position of the hand of the user 200 on the basis of the images, and thus determines whether the hand and the finger move or pose for the input.

At operation S13, the display apparatus 100 displays the pointer corresponding to the analyzed motion of the user 200. For example, the controller 150 moves the mouse-based cursor or the keyboard-based cursor corresponding to the motion of the hand.

At operation S14, the display apparatus 100 generates the input signal corresponding to the analyzed motion of the user. For example, if it is determined that the motion of the finger is provided for generating the input signal, i.e., if the finger poses for pressing a key, the input signal corresponding to the key of the keyboard is generated corresponding to the finger's position.

In addition, if the controller 150 determines that the back and the palm of the user's hand are alternately shown when analyzing the motion of the user 200, the start pointer may be displayed.

Figure 4:
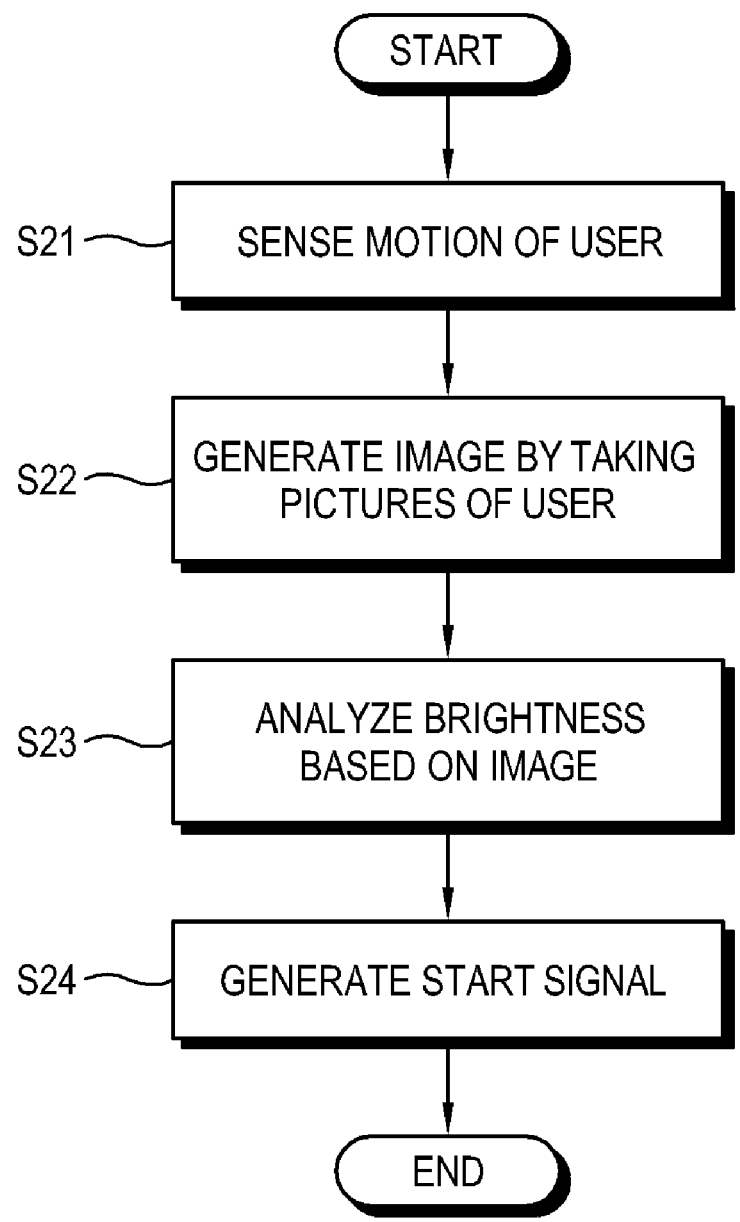
FIG. 4 is a flowchart of a starting operation of the display apparatus according to an exemplary embodiment of the present invention.

Referring to FIG. 4, at operation S21, the display apparatus 100 senses the motion of the user 200. At operation S22, the display apparatus 100 continuously takes pictures of the user 200 to thereby generate images of the user 200 in detail. At operation S23, the display apparatus 100 analyzes the brightness of the generated images. At operation S24, the display apparatus 100 generates the start signal.

For example, if the back and the palm of the user's hand are alternately and repetitively shown to the camera, the quantity of light is alternately increased and decreased in the sensed image because the palm has low melanin content regardless of race. If it is determined that such variation in the quantity of light is higher than a predetermined value, the controller 150 converts the input mode for the physical input unit into the virtual input mode for receiving the input depending on the user's motion.

Then, the display apparatus 100 displays the virtual keyboard and the virtual hand put on the virtual keyboard, and moves the virtual hand in accordance with the analyzed motion of the user's hand.

Figure 5:
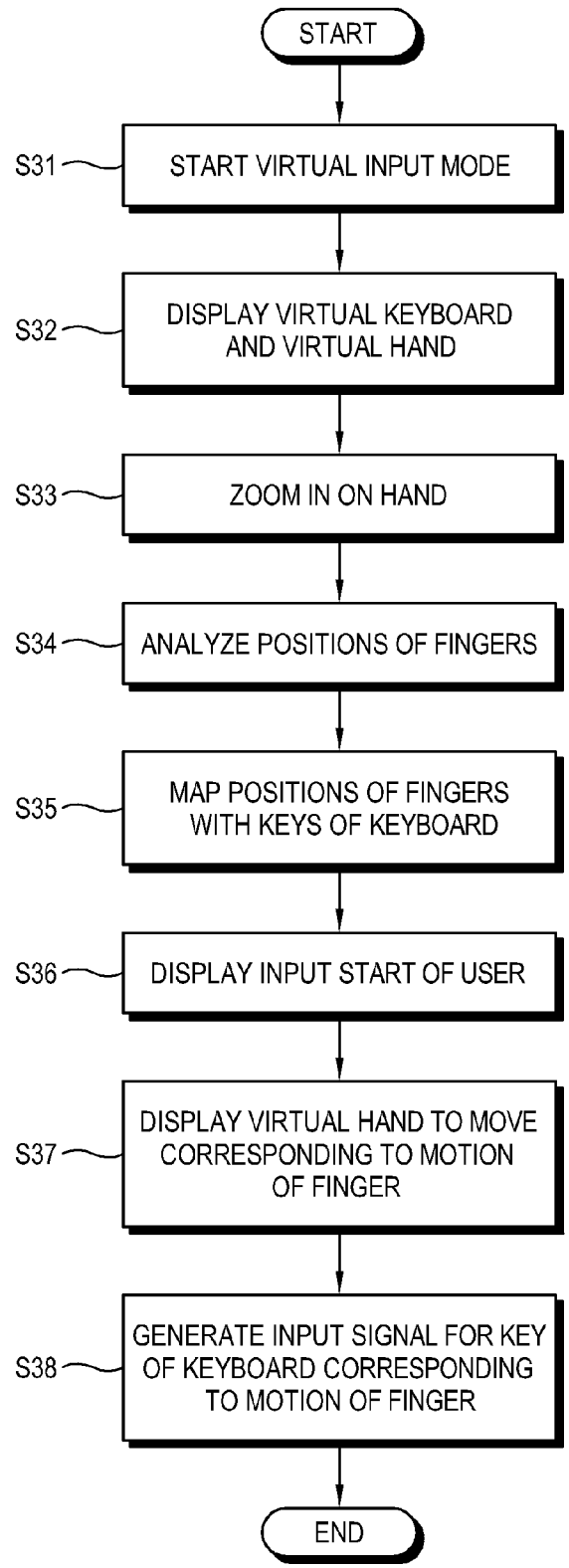
FIG. 5 is a flowchart of displaying a pointer and generating an input signal in the display apparatus according to an exemplary embodiment of the present invention.

Referring to FIG. 5, at operation S31, the display apparatus 100 starts the virtual input mode. At operation S32, the virtual keyboard and the virtual hand are displayed through the display unit 130. As shown in FIG. 2, the virtual keyboard 20 as the input unit and the virtual hand 30 may be displayed on the screen 10 of the display unit 130. Since the virtual hand 30 corresponds to the physical hand of the user 200, the virtual hand 30 can have the same pose as the hand or the finger of the user 200 when the hand or the finger moves. Thus, the user 200 can see where the virtual hand 30 is put on the keys of the virtual keyboard 20, so that the key input can be more correct.

At operation S33, the display apparatus 100 zooms in on the hand of the user. When the user 200 starts the input, the images are analyzed in the state that the hand of the user 200 is zoomed in on, so that the motion of the hand can be easily analyzed.

At operation S34, the display apparatus 100 analyzes the position of the finger of the user. Then, at operation S35, the positions of the fingers are mapped with predetermined positions of the keyboard. For example, at the default state of the virtual input mode, the first fingers of both virtual hands 30 displayed on the screen 10 may be placed on "F" and "J" keys of the virtual keyboard 20.

At operation S36, the display apparatus 100 displays an input start of the user 200 on the display unit 130. At this time, the display apparatus 100 is ready for receiving the input from the user 200, and displays a message of allowing the user 200 to start the input through the display unit 130.

At operation S37, the display apparatus 100 displays the virtual hand 30 to move corresponding to the motion of the physical finger. The virtual hand 30 corresponds to the physical hand of the user 200, so that the virtual hand 30 can have the same pose as the hand or the finger of the user 200 when the hand or the finger moves.

At operation S38, the display apparatus 100 generates the input signal for the key of the keyboard corresponding to the motion of the finger. For example, if the user 200 moves his/her finger so as to place a virtual finger displayed through the screen to an "A" key of the virtual keyboard 20 and then poses for pressing the "A" key, the display apparatus 100 determines this motion of the user 200 as the key input and generates the input signal for the "A" key.

As described above, the present invention provides a display apparatus which can receive inputs from a user without needing an additional physical device and being subject to spatial limitations, and a control method thereof.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a display apparatus, comprising:
    displaying a pointer corresponding to motion of a user, in which the user's motion is analyzed on the basis of images generated by sensing the user wherein if a quantity of light is alternately increased and decreased in the sensed image, the motion of the user is analyzed as a back and a palm of a hand of the user are alternately switched; and
    generating an input signal preset corresponding to the analyzed motion of the user.

2. The method according to claim 1, wherein the displaying the pointer comprises displaying a virtual input unit and a virtual hand put on the virtual input unit.

3. The method according to claim 1, wherein the displaying the pointer comprises generating a plurality of images by taking pictures of the user.

4. The method according to claim 1, further comprising recognizing who the user is on the basis of the generated images, and storing information about the motion of the user in a database.

5. The method according to claim 4, wherein the displaying the pointer and the generating the input signal comprise analyzing the motion of a part of a body of the user on the basis of the information stored in the database.

6. The method according to claim 1, further comprising analyzing the motion of a part of a body of the user according to preset motion sensitivity.

7. A method of controlling a display apparatus, comprising:
    displaying a pointer corresponding to motion of a user, in which the user's motion is analyzed on the basis of images generated by sensing the user; and
    generating an input signal preset corresponding to the analyzed motion of the user wherein the displaying the pointer comprises displaying a virtual input unit and a virtual hand put on the virtual input unit, and wherein the displaying the pointer comprises displaying a start pointer when it is determined that a back and a palm of a hand of the user are alternately shown when analyzing the motion of the user.

8. The method according to claim 7, wherein the displaying the pointer comprises displaying the virtual hand to move corresponding to the motion of the user's hand when analyzing the motion of the user.

9. A display apparatus comprising:
an image sensing unit which senses a user to generate images;
an image processor which processes a pointer to be displayed;
a display unit which displays the processed image;
a controller which controls the image processor to display the pointer corresponding to motion of a user, in which the user's motion is analyzed on the basis of the generated images wherein if a quantity of light is alternately increased and decreased in the sensed image, the motion of the user is analyzed as a back and a palm of a hand of the user are alternately switched, and generates an input signal preset corresponding to the analyzed motion of a part of a body of the user.

10. The display apparatus according to claim 9, wherein the controller controls the image processor to display a virtual input unit and a virtual hand put on the virtual input unit.

11. The display apparatus according to claim 9, wherein the image sensing unit generates a plurality of images by taking pictures of the part of the body of the user.

12. The display apparatus according to claim 9, further comprising a storage unit which stores the input signal corresponding to the motion of the part of the body of the user.

13. The display apparatus according to claim 9, wherein the controller recognizes who the user is on the basis of the generated images, stores information about the motion of the user in a database, and analyzes the motion of the part of the body of the user on the basis of the information stored in the database.

14. The display apparatus according to claim 9, wherein the controller analyzes the motion of the part of the body of the user according to preset motion sensitivity, and generates the input signal preset corresponding to the analyzed motion of the user.

15. A display apparatus comprising:
an image sensing unit which senses a user to generate images;
an image processor which processes a pointer to be displayed;
a display unit which displays the processed image;
a controller which controls the image processor to display the pointer corresponding to motion of a user, in which the user's motion is analyzed on the basis of the generated images, and generates an input signal preset corresponding to the analyzed motion of a part of a body of the user,
wherein the controller controls the image processor to display a virtual input unit and a virtual hand put on the virtual input unit, and
wherein the controller controls the image processor to display a start pointer when it is determined that a back and a palm of a hand of the user are alternately shown.

16. The display apparatus according to claim 15,
wherein the controller controls the image processor to display the virtual hand to move corresponding to the motion of the user's hand.

* * * * *